(12) United States Patent
Kanematsu

(10) Patent No.: US 9,075,689 B2
(45) Date of Patent: Jul. 7, 2015

(54) FIRMWARE UPDATE SYSTEM INCREASED IN POSSIBILITY OF EXECUTION OF AUTOMATIC FIRMWARE UPDATE PROCESSING

(71) Applicant: CANON KABUSHIKI KAISHA, Tokyo (JP)

(72) Inventor: Shinichi Kanematsu, Inagi (JP)

(73) Assignee: CANON KABUSHIKI KAISHA (JP)

( * ) Notice: Subject to any disclaimer, the term of this patent is extended or adjusted under 35 U.S.C. 154(b) by 221 days.

(21) Appl. No.: 13/909,167

(22) Filed: Jun. 4, 2013

(65) Prior Publication Data

US 2014/0047430 A1    Feb. 13, 2014

(30) Foreign Application Priority Data

Jun. 4, 2012    (JP) ................................. 2012-127008

(51) Int. Cl.

| | | |
|---|---|---|
| *G06F 15/16* | (2006.01) | |
| *G06F 15/177* | (2006.01) | |
| *G06F 3/00* | (2006.01) | |
| *G06F 9/00* | (2006.01) | |
| *G06F 9/24* | (2006.01) | |
| *G06F 9/44* | (2006.01) | |
| *G06F 9/46* | (2006.01) | |
| *G06F 13/00* | (2006.01) | |
| *H04N 1/00* | (2006.01) | |
| *G06F 11/00* | (2006.01) | |
| *G06F 9/445* | (2006.01) | |

(52) U.S. Cl.
CPC .. *G06F 8/65* (2013.01); *H04N 1/00* (2013.01); *G06F 11/00* (2013.01); *G06F 13/00* (2013.01)

(58) Field of Classification Search
CPC ............... G06F 8/60; G06F 8/61; G06F 8/63; G06F 8/65; G06F 9/44; G06F 9/4443; H04L 67/34

See application file for complete search history.

(56) References Cited

U.S. PATENT DOCUMENTS

| | | | |
|---|---|---|---|
| 7,876,469 B2 * | 1/2011 | Hanada | 717/168 |
| 8,745,609 B2 * | 6/2014 | Oka | 717/168 |
| 2003/0233493 A1 * | 12/2003 | Boldon et al. | 710/1 |
| 2005/0088689 A1 * | 4/2005 | Suga et al. | 710/10 |
| 2007/0169090 A1 * | 7/2007 | Kang | 717/168 |
| 2009/0112941 A1 * | 4/2009 | Lo et al. | 707/202 |

(Continued)

FOREIGN PATENT DOCUMENTS

JP    2009-187456 A    8/2009

*Primary Examiner* — Don Wong
*Assistant Examiner* — Anibal Rivera
(74) *Attorney, Agent, or Firm* — Rossi, Kimms & McDowell LLP

(57) ABSTRACT

A firmware update system capable of executing update processing despite that the combination of versions of firmware components installed in an image processing apparatus is normal. A HDD of the apparatus stores in advance a first version management list indicating versions of the respective firmware components and a representative version for managing the versions of the firmware components. Actual versions of the firmware components are collected. When the actual versions are different from the versions in the first version management list, the actual versions and the representative version are transmitted to a server. The server determines update firmware based on the actual versions and the representative version from second version management lists stored in the server. The firmware components installed in the apparatus are updated using the update firmware provided by the server.

4 Claims, 16 Drawing Sheets

(56) References Cited

U.S. PATENT DOCUMENTS

| | | | |
|---|---|---|---|
| 2009/0241099 A1* | 9/2009 | Lee et al. | 717/168 |
| 2011/0145804 A1* | 6/2011 | Oka | 717/168 |
| 2013/0138718 A1* | 5/2013 | Mallur et al. | 709/203 |
| 2013/0138783 A1* | 5/2013 | Mallur et al. | 709/221 |
| 2013/0139139 A1* | 5/2013 | Mallur et al. | 717/170 |
| 2013/0139183 A1* | 5/2013 | Mallur et al. | 719/321 |
| 2013/0145141 A1* | 6/2013 | Han et al. | 713/2 |

* cited by examiner

FIRMWARE UPDATE SYSTEM INCREASED IN POSSIBILITY OF EXECUTION OF AUTOMATIC FIRMWARE UPDATE PROCESSING

BACKGROUND OF THE INVENTION

1. Field of the Invention

The present invention relates to a firmware update system increased in the possibility of execution of automatic firmware update processing.

2. Description of the Related Art

An image processing apparatus equipped with a plurality of functions, such as a digital multifunction peripheral, is composed of a plurality of components, such as a main controller, a printer engine for performing image formation, and a facsimile machine, and has respective associated firmware components installed in the components.

Some of such image processing apparatus have a function for automatically performing update processing of the firmware components thereof. To execute the automatic update processing, there is proposed a method in which an image processing apparatus connects to an update server via a network, and updates the firmware thereof to the latest firmware from the update server (see e.g. Japanese Patent Laid-Open Publication No. 2009-187456). This method has large benefits for both general users of image processing apparatuses and service technicians of sales companies, and has come to be widely used.

According to the method proposed in Japanese Patent Laid-Open Publication No. 2009-187456, version information of the plurality of firmware components of an image processing apparatus is transmitted to a server, and it is determined whether or not there is any firmware component of a new version, whereby firmware update is efficiently executed.

As described above, the image processing apparatus is composed of a plurality of components having respective associated firmware components installed therein, and the firmware components operate in cooperation with each other, to thereby realize a copy function, a print function, and a FAX function, as a system.

Therefore, to guarantee correct operations of the image processing apparatus, the firmware components are required to have respective versions in a correct combination. To this end, a method is employed in which a version management list describing a combination of versions of all the firmware components, which guarantees the proper operation of the image processing apparatus, is used to perform easy and convenient firmware management of the whole image processing apparatus.

In this method, the version management list is stored in a storage device of the image processing apparatus, and contents of the list are supposed to match version information of all the firmware components actually installed in the image processing apparatus. For example, in the initial state of the image processing apparatus immediately after shipment from its manufacturer, as a matter of fact, the contents of the list and the version information match each other.

When updating firmware components, the manufacturer of the image processing apparatus creates new firmware components as well as a new version management list describing all versions of the firmware components including the versions of the new firmware components, and registers the new version management list in the update server. Note that each version management list includes description of a version number of the version management list itself.

The update server acquires a version number of the version management list of the image processing apparatus for which update processing is to be performed, selects, based on the acquired version number, a version number of a version management list based on which the update processing is to be performed next, and executes the update processing of firmware components to be updated, which are determined based on the version management lists having the respective version numbers.

As described above, in the update processing of the image processing apparatus composed of a plurality of components having respective associated firmware components installed therein, it is unnecessary for a user to check the versions of all the firmware components each time, whereby it is possible to maintain the latest and correct combination of firmware components.

In the management method using the version management list that represents a combination of a plurality of firmware components, when a component having a firmware component installed therein is replaced, there can occur a state where the versions of the version management list in the image processing apparatus and the versions of the firmware components actually installed in the same are different.

In this case, a firmware management module of the image processing apparatus cannot determine whether or not versions of the respective firmware components are in a correct combination that guarantees the proper operation of the image processing apparatus.

For example, a digital multifunction peripheral or a like image processing apparatus stores various kinds of data including user data, image processing settings, device control adjustment values, and so forth.

If the firmware components are forcibly updated from the state where it is impossible to determine whether or not versions of the respective firmware components are in a correct combination, there is a fear that data is lost in accordance with update of the firmware.

Further, depending on details of update of the firmware components, unless the firmware update is performed by updating the firmware to intermediate versions, the system per se sometimes becomes incapable of being started up e.g. due to a change in the allocation of a system memory area.

To avoid such a problem, in a case where the versions of firmware components indicated in the version management list of the image processing apparatus and the versions of installed firmware components do not match each other, the firmware management module of the image processing apparatus determines that the versions of the firmware components are not in a proper combination, and even if execution of update processing is attempted, the firmware management module stops the update processing.

Actually, however, it sometimes occurs that a version management list including the version of a firmware component installed in a new component has already been issued and the combination of the versions of the firmware components of the image processing apparatus subjected to the component replacement is a normal combination.

Therefore, in spite of the fact that update processing can be executed, the update processing is sometimes stopped. In this case, it is required to dispatch a service technician to a customer's site to have him manually rewrite the version of the firmware component of the replaced component in the version management list, to thereby cause the respective versions of the firmware components in the version management list to match the respective versions of the firmware components installed in the components to match each other.

SUMMARY OF THE INVENTION

The present invention provides a firmware update system capable of executing update processing which cannot be executed by a conventional technique despite the fact that the combination of firmware components installed in an image processing apparatus is normal.

The present invention provides a firmware update system including an image processing apparatus in which a plurality of firmware components are installed and which operates according to the plurality of firmware components, and a server which provides update firmware for updating the plurality of firmware components, to the image processing apparatus, wherein the image processing apparatus comprises a first storage unit configured to store in advance a first version management list indicating versions of the respective firmware components and a representative version for managing the versions of the respective firmware components, a collection unit configured to collect actual versions of the plurality of firmware components, a first determination unit configured to determine whether or not there is a difference between the actual versions collected by the collection unit and the versions of the respective firmware components indicated in the first version management list, a transmission unit configured to, when it is determined by the first determination unit that there is a difference between the actual versions and the versions of the respective firmware components indicated in the first version management list, transmit the actual versions and the representative version indicated in the first version management list, to the server, and an update unit configured to update the firmware components installed in the image processing apparatus using the update firmware provided by the server, and wherein the server comprises a second storage unit configured to store in advance a plurality of second version management lists each indicating a normal combination of versions of the firmware components of the image processing apparatus and a representative version, a second determination unit configured to determine whether or not the plurality of second version management lists include a second version management list indicating versions of the firmware components which match the actual versions transmitted from the transmission unit, and a provision unit configured to provide, when the second determination unit determines that the plurality of second version management lists include a second version management list indicating versions of the firmware components which match the actual versions, and when the plurality of second version management lists include a second version management list that includes any firmware component newer than a corresponding firmware component indicated in the second version management list indicating the versions of the firmware components which match the actual versions, firmware indicated in the second version management list including the newer firmware component, to the image processing apparatus, as update firmware.

According to the present invention, it is possible to provide the firmware update system capable of executing update processing which cannot be executed by the conventional technique despite the fact that the combination of firmware components installed in the image processing apparatus is normal.

Further features of the present invention will become apparent from the following description of exemplary embodiments with reference to the attached drawings.

BRIEF DESCRIPTION OF THE DRAWINGS

FIGS. 11A and 11B are views of screens displayed on the console section in FIG. 2 when update processing is performed, in which FIG. 11A shows a screen displayed when the update processing is being performed and FIG. 11B shows a screen displayed when the update processing has been normally terminated.

FIGS. 12A and 12B are views of screens displayed on the console section in FIG. 2 when the update processing is unsuccessful, in which FIG. 12A shows a screen displayed when the update processing has failed with an error code of E010, and FIG. 12B shows a screen displayed when the update processing has failed with an error code of E200.

DESCRIPTION OF THE EMBODIMENTS

The present invention will now be described in detail below with reference to the accompanying drawings showing embodiments thereof.

Figure 1:
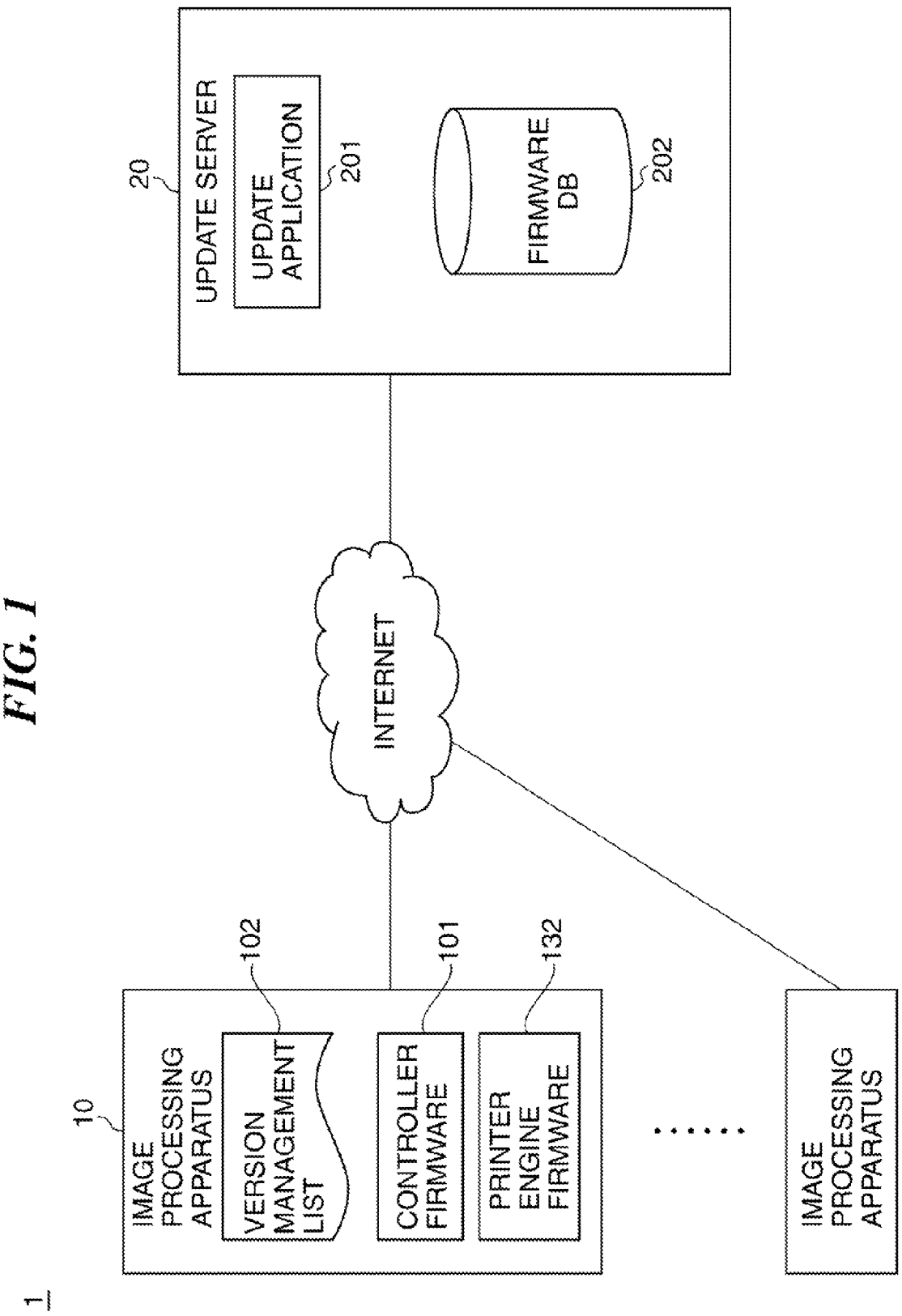
FIG. 1 is a schematic diagram of a firmware update system according to an embodiment of the present invention.

FIG. 1 is a schematic diagram of a firmware update system 1 according to an embodiment of the present invention.

Referring to FIG. 1, the firmware update system 1 comprises a plurality of image processing apparatuses including an image processing apparatus 10, and an update server 20 (server). The image processing apparatuses and the update server 20 are connected to each other via the Internet.

The update server 20 performs management and distribution of firmware for each image processing apparatus as a target of firmware update. As shown in FIG. 1, the update server 20 is singly provided and is capable of updating the plurality of image processing apparatuses.

Further, the update server 20 includes an update application 201 for implementing update processing, and a firmware database (DB) 202 for storage and management of the firmware of the image processing apparatus 10.

The image processing apparatus 10 according to the present embodiment is composed of a plurality of components having respective associated firmware components installed therein, and version information of all the firmware components of the image processing apparatus 10 is managed using a version management list 102.

Further, the firmware of the image processing apparatus 10 comprises controller firmware 101 and printer engine firmware 132. Firmware versions of the controller firmware 101 and the printer engine firmware 132 are described in the version management list 102.

The controller firmware 101 and the printer engine firmware 132 operate in cooperation with each other, and hence the image processing apparatus 10 is shipped from a factory in a state in which the respective versions of the controller firmware 101 and the printer engine firmware 132 are in such a combination that the operation of the image processing apparatus 10 is guaranteed by the manufacturer.

Figure 2:
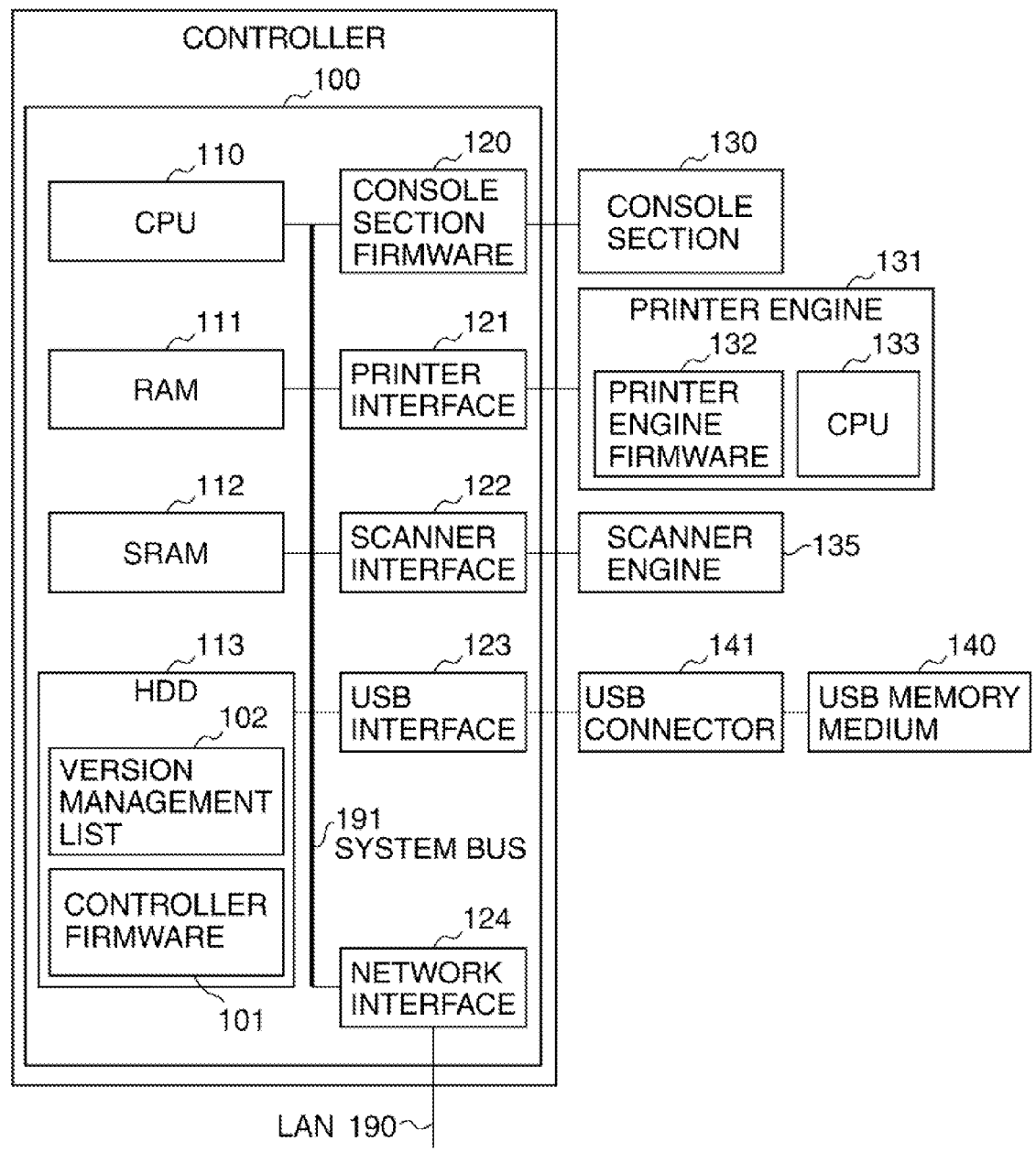
FIG. 2 is a schematic diagram of an image processing apparatus appearing in FIG. 1.

FIG. 2 is a schematic diagram of the image processing apparatus 10 appearing in FIG. 1.

Referring to FIG. 2, a controller 100 comprises a CPU 110, a RAM 111, a SRAM (static RAM) 112, a HDD (hard disk drive) 113, a console section interface 120 a printer interface 121, a scanner interface 122, a USB interface 123, and a network interface 124. These sections are connected to each other by a system bus 191.

The CPU 110 controls the overall operation of the image processing apparatus 10. The RAM 111 is used for loading programs and temporarily storing various kinds of data. The SRAM 112 is provided with a backup power supply, and is used for storing image processing parameters, adjustment values, and user-set data, of the image processing apparatus 10, which are set on an individual apparatus basis.

The HDD 113 stores the version management list 102 and the controller firmware 101. The controller firmware 101 is loaded into the RAM 111 at the start of the image processing apparatus 10. The CPU 110 operates according to the controller firmware 101 whereby it is capable of realizing the functions of the image processing apparatus 10 and updating the firmware.

The console section interface 120 is an interface between a console section 130 and the controller 100. The printer interface 121 is an interface between a printer engine 131 and the controller 100. The scanner interface 122 is an interface between a scanner engine 135 and the controller 100. The network interface 124 is an interface between a LAN (local area network) 190 and the controller 100.

The USB interface 123 is an interface between a USB memory medium 140 connected to a USB connector 141 and the controller 100. The controller firmware 101 is capable of recognizing the USB memory medium 140 by the USB interface 123, and reading update firmware stored in the USB memory medium 140.

The console section 130 receives user operations and displays various kinds of information to the user.

The printer engine 131 is a unit for forming image data input from the controller 100 on a recording medium, such as paper, and includes its own CPU 133 for controlling mechanical operations, such as conveyance of the recording medium, and the printer engine firmware 132.

The printer engine firmware 132 is executed by the CPU 133, thereby implementing image forming processing while operating in cooperation with the controller firmware 101.

The scanner engine 135 reads an image formed on an original, and inputs image data indicative of the image to the controller 100 via the scanner interface 122.

As described above, the image processing apparatus 10 according to the present embodiment has the firmware (controller firmware and printer engine firmware) installed therein, and operates according to the firmware components.

Figure 3:
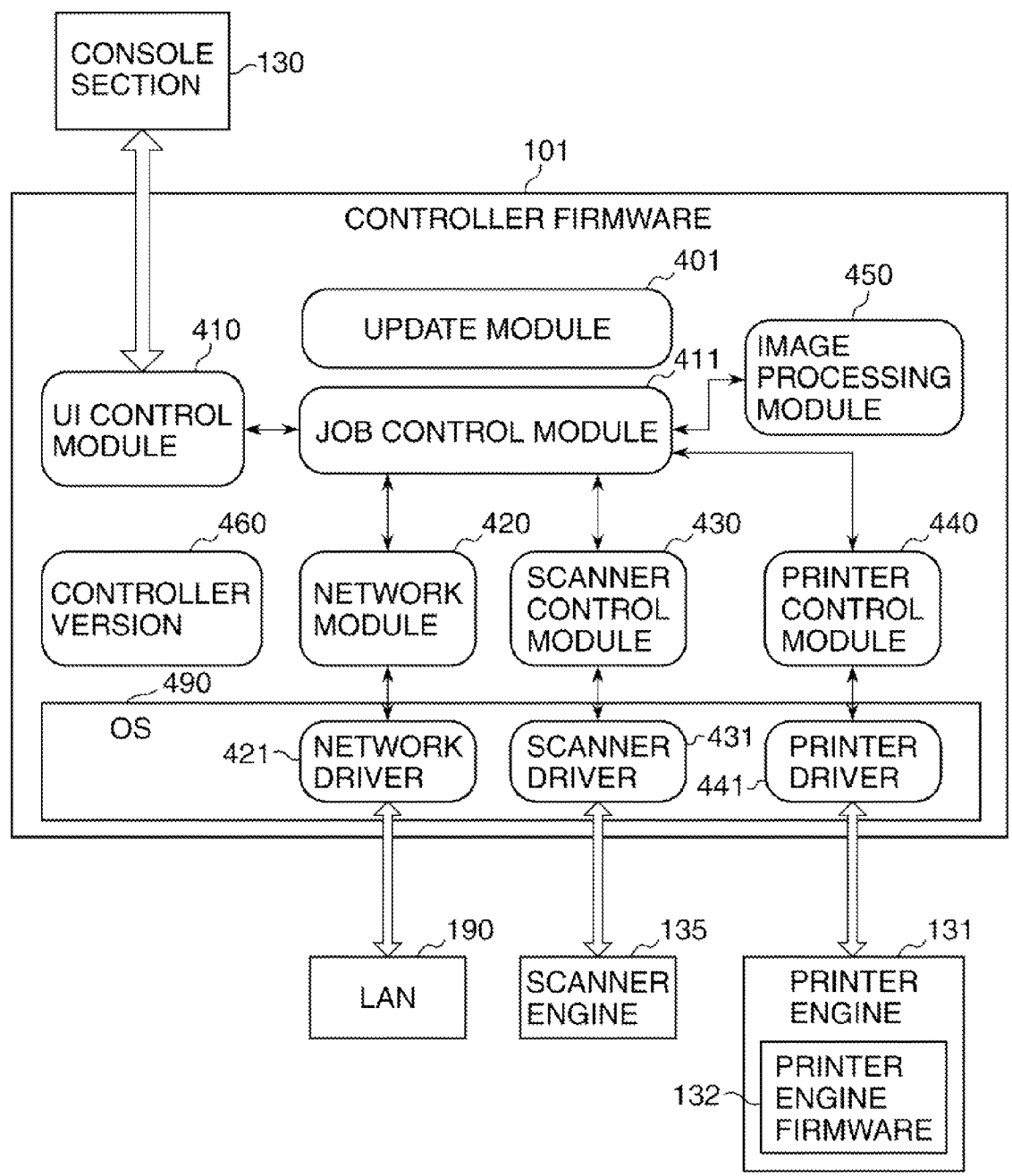
FIG. 3 is a view showing the software module configuration of controller firmware appearing in FIG. 2.

FIG. 3 is a view of software modules of the controller firmware 101 appearing in FIG. 2.

Referring to FIG. 3, an OS (operating system) 490 is basic software for mediating between the controller firmware 101 and the hardware, and integrates a network driver 421, a scanner driver 431, and a printer driver 441.

A user interface (UI) control module 410 controls the console section 130, thereby executing control processing of a user input to the console section 130 and causing various kinds of information to be displayed on the console section 130.

When image processing is instructed via the console section 130 or the LAN 190, a job control module 411 performs centralized control of modules that perform job operations of the image processing apparatus 10, including an image processing module 450 that executes image processing, thereby controlling an image processing operation.

A network module 420 processes data received from a network via the network driver 421.

A scanner control module 430 and a printer control module 440 controls the scanner engine 135 and the printer engine 131 via the scanner driver 431 and the printer driver 441, respectively. An update module 401 executes update processing for updating the firmware of the image processing apparatus 10. A controller version 460 indicates the version of the controller firmware 101, and is stored in the HDD 113.

Figure 4:
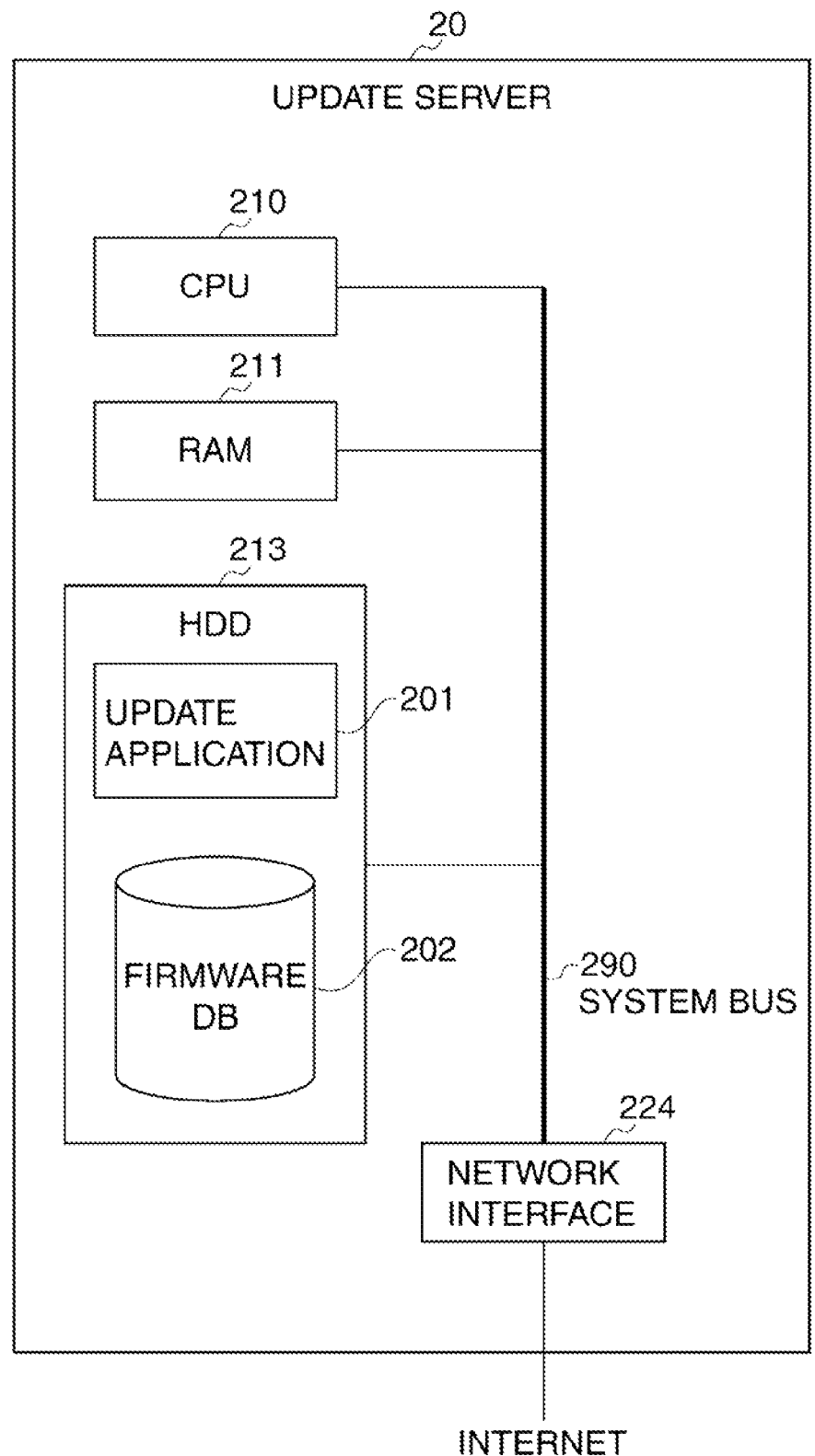
FIG. 4 is a schematic diagram of an update server shown in FIG. 1.

FIG. 4 is a schematic diagram of the update server 20 appearing in FIG. 1.

Referring to FIG. 4, the update server 20 comprises a CPU 210, a RAM 211, an HDD 213, and a network interface 224, which are connected to each other by a system bus 290.

The CPU 210 controls the overall operation of the update server 20. The RAM 211 is used for loading programs and temporarily storing various kinds of data.

The HDD 213 stores the update application 201 for performing selection, management and distribution of the firmware of the image processing apparatus 10, and the firmware database 202.

The update application 201 is loaded into the RAM 211 after the start of the update server 20. The CPU 210 operates according to the update application 201 to thereby refer to the firmware database 202 and execute update processing on the image processing apparatus 10.

The network interface 224 is an interface between the Internet and the update server 20.

Figure 5:
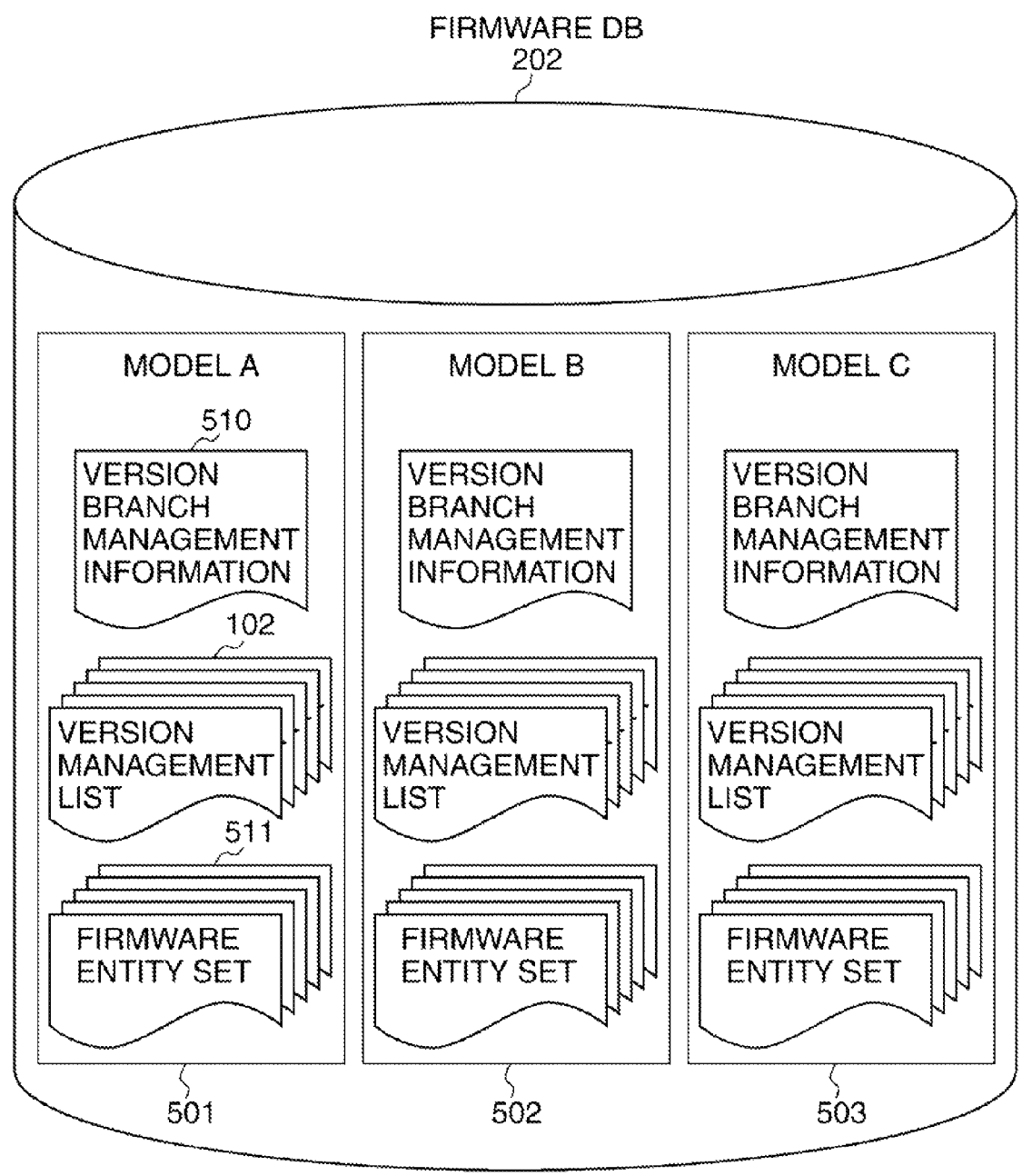
FIG. 5 is a view showing an example of a firmware database appearing in FIG. 4.

FIG. 5 is a view showing an example of the firmware database 202 appearing in FIG. 4.

The firmware database 202 shown in FIG. 5 is associated with three apparatus models: A, B, and C, by way of example.

The firmware database 202 is provided with model A information 501, model B information 502, and model C information 503 of the respective models A, B, and C. Each of the model A information 501, the model B information 502, and the model C information 503 is composed of elements having the same formats, and the following description will be given of the model A information, by way of example.

The model A information comprises version branch management information 510, the version management lists 102, and a firmware entity set 511. Among the above, the version branch management information 510 and the version management lists 102 will be described with reference to other figures. Further, the firmware entity set 511 is update firmware provided to the image processing apparatus 10.

As described above, the update server 20 provides the update firmware for updating the firmware to the image processing apparatus 10.

Figure 6:
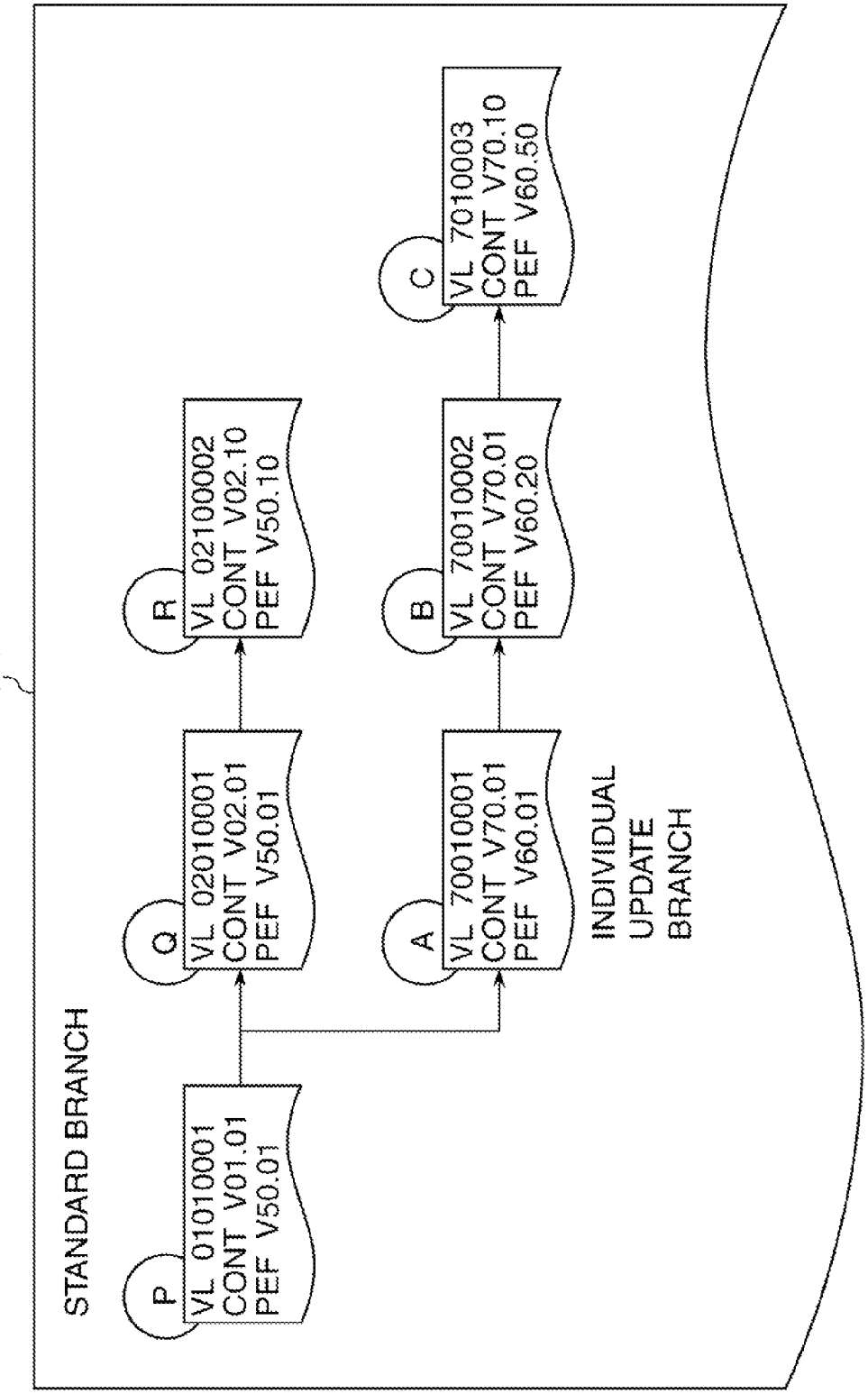
FIG. 6 is a diagram of version branch management information appearing in FIG. 5.

FIG. 6 is a view of the version branch management information 510 appearing in FIG. 5.

Referring to FIG. 6, the version branch management information 510 includes a standard branch (P-Q-R) and an individual update branch (A-B-C) in a list format. As illustrated by the branches, the version branch management information 510 indicates a family tree of versions.

Further, VL denotes a representative version representative of a combination of respective versions of firmware components (controller firmware and printer engine firmware)of the image processing apparatus 10. CONT denotes the version of controller firmware, and PEF denotes the version of printer engine firmware.

Furthermore, FIG. 6 shows that the firmware version has been upgraded in the order of firmware versions (which correspond to respective version management lists appearing in FIG. 5) P, Q, and R or in the order of firmware versions P, A, B, and C. Therefore, in the case of FIG. 6, the firmware version has been branched from the firmware version P to the firmware versions Q and A. Further, each of the firmware versions P, Q, R, A, B, and C shows a normal combination of versions of firmware components of the image processing apparatus 10 and a representative version.

Figure 7:
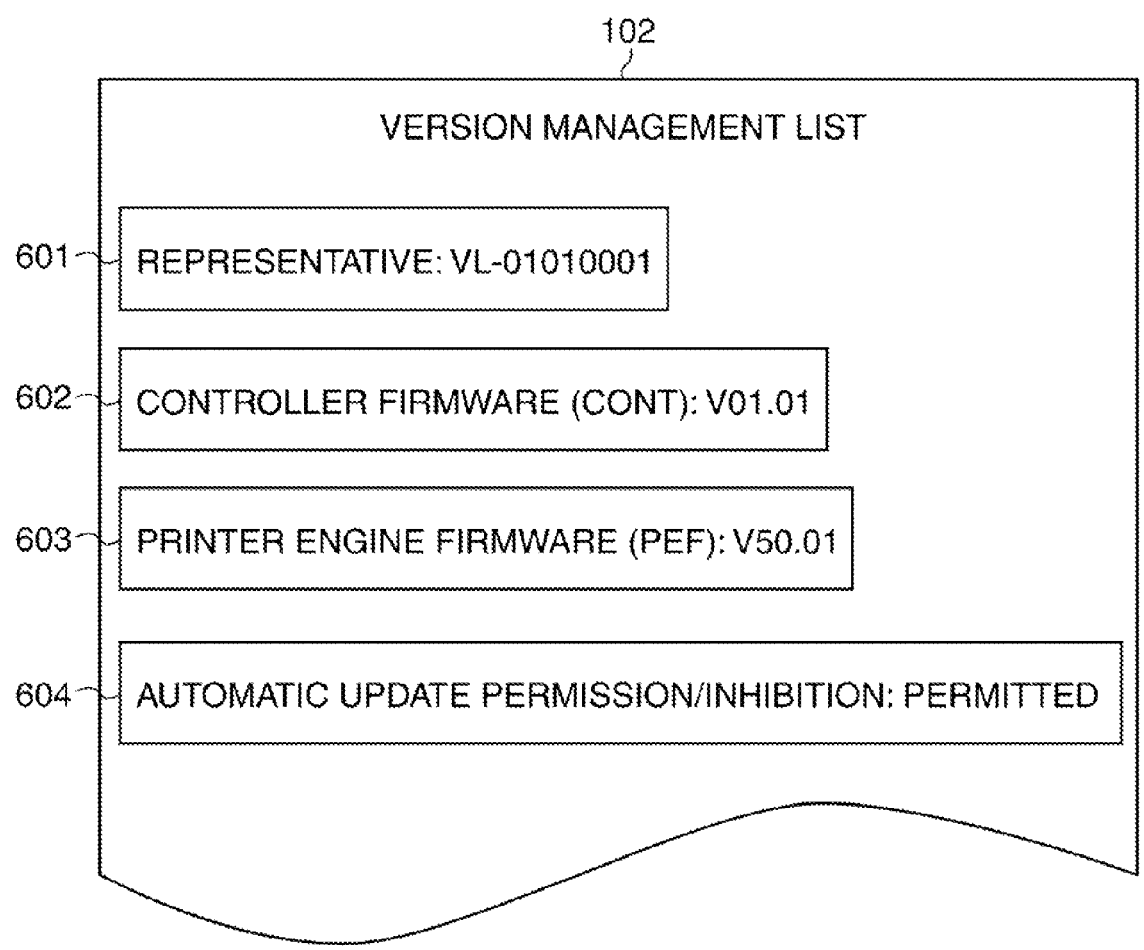
FIG. 7 is a view of an example of a version management list appearing in FIG. 5.

FIG. 7 is a view of an example of the version management list 102 appearing in FIG. 5.

Referring to FIG. 7, the version management list 102 is management information in which firmware components necessary for the image processing apparatus 10 and versions of the firmware components are enumerated. The version management list 102 is generated and managed by the manufacturer of the image processing apparatus 10. The representative version, denoted by 601, is uniquely added to each version management list.

A controller firmware version 602 indicates a version of the controller firmware 101. A printer engine firmware version 603 indicates a version of the printer engine firmware 132.

By identifying the representative version 601 in the version management list 102, it is possible to identify version information of all the firmware components of the image processing apparatus 10, and a combination of the versions of the firmware components.

An automatic update permission/inhibition 604 indicates whether or not update processing can be performed without dispatching a service technician. The automatic update permission/inhibition 604 corresponds to permission/inhibition information indicative of whether or not firmware installed in the image processing apparatus 10 can be automatically updated using update firmware when the firmware components are provided to the image processing apparatus 10 as the update firmware.

The version management list 102 shown in FIG. 7 corresponds to a second version management list indicating a normal combination of versions of firmware components of the image processing apparatus 10 and a representative version. As shown in FIG. 5, a plurality of second version management lists are stored in advance in the firmware database 202 of the HDD 213 (second storage unit).

Hereinafter, a description will be given of a screen displayed on the console section 130, and then update processing executed by the firmware update system 1 according to the present embodiment will be described.

Figure 8:
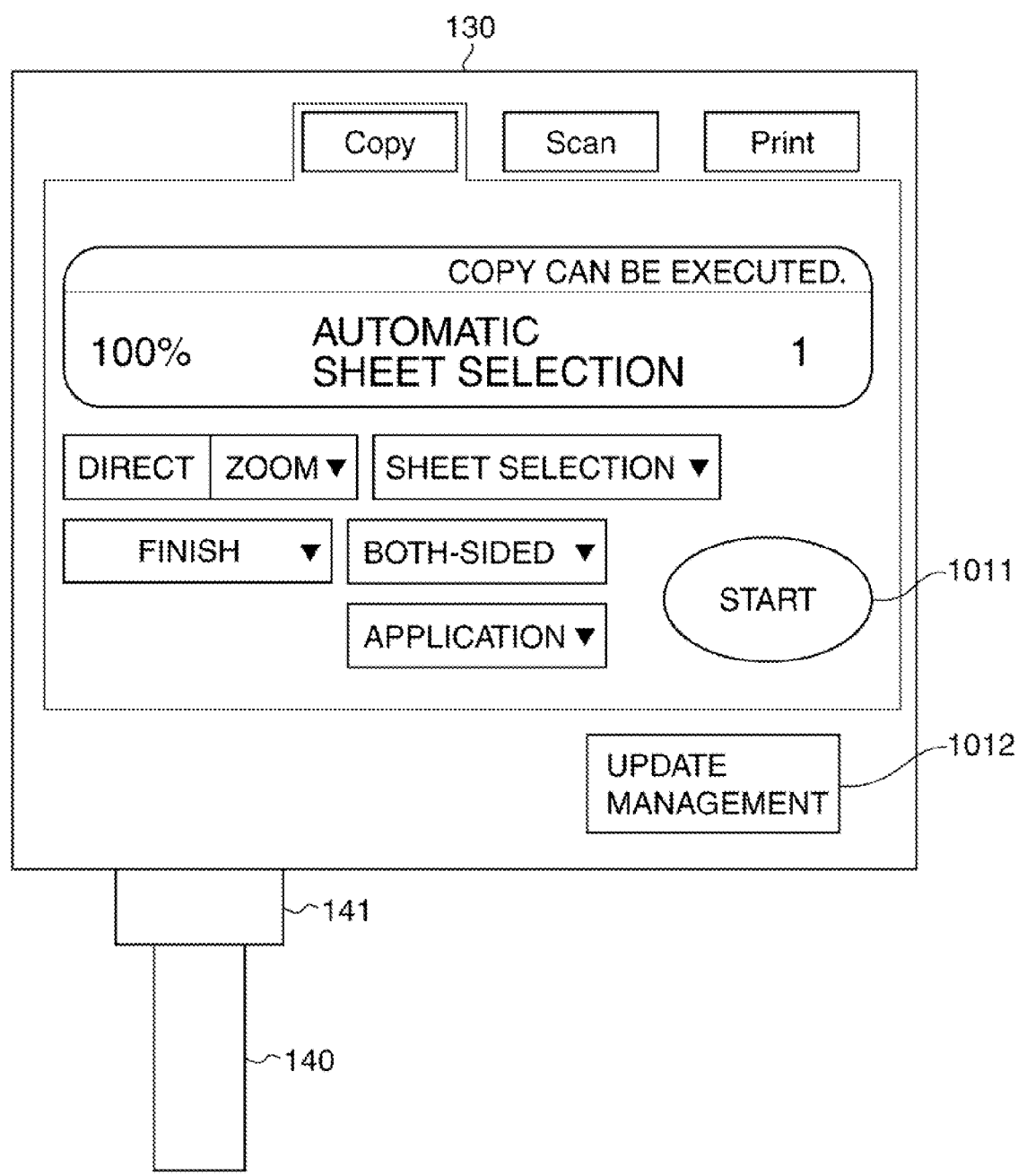
FIG. 8 is a view of a copy function screen displayed on a console section appearing in FIG. 2.

FIG. 8 is a view of a copy function screen displayed on the console section 130 in FIG. 2.

Referring to FIG. 8, the console section 130 is equipped with the USB connector 141, which enables the USB memory medium 140 to be connected to the console section 130.

Further, a start key 1011 is used to start a copy operation. When the start key 1011 is depressed by the user, the controller firmware 101 detects an instruction for the copy operation, and starts control of a copy job in cooperation with the scanner engine 135 and the printer engine 131.

An update management key 1012 is used to switch the screen to an update management screen, described hereinafter.

Figure 9:
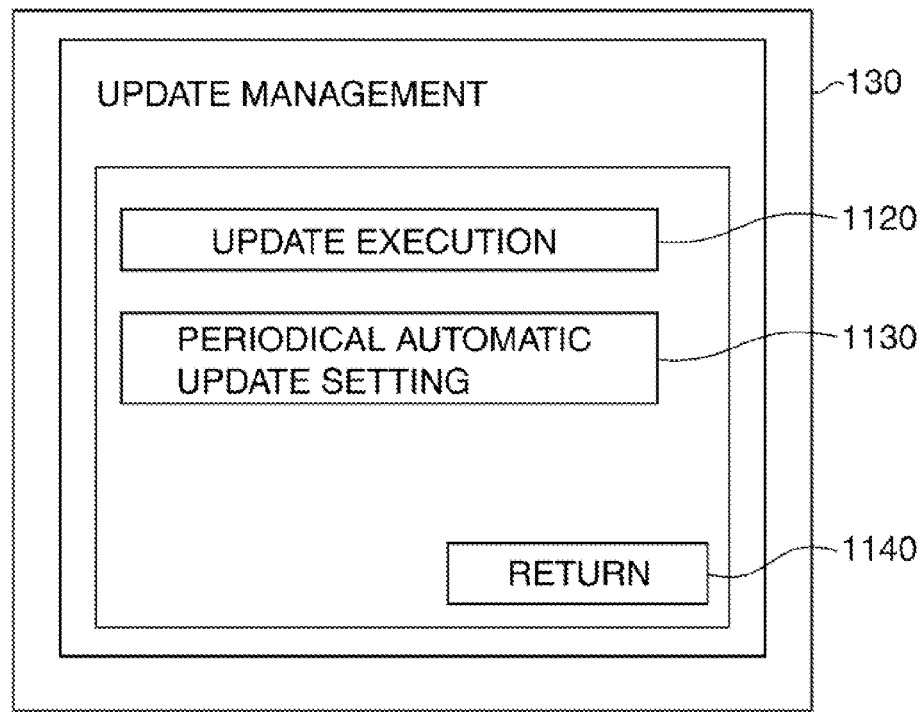
FIG. 9 is a view of an update management screen which is displayed when an update management key appearing in FIG. 8 is depressed.

FIG. 9 is a view of the update management screen which is displayed when the update management key 1012 appearing in FIG. 8 is depressed.

Referring to FIG. 9, an update execution button 1120 is used to instruct the image processing apparatus 10 to start the update processing. When the update execution button 1120 is depressed by the user, the update processing is executed.

Further, a periodical automatic update-setting button 1130 is used to switch the screen to a screen for setting an execution date and time, when the update processing is to be automatically executed.

A return button 1140 is used to cause the screen to return to a screen displayed immediately before the present screen is displayed. Return buttons appearing in figures, referred to hereinafter, also provide the same function, and hence description thereof is omitted. Note that when the return button 1140 in FIG. 9 is depressed, the FIG. 8 screen is displayed.

Figure 10:
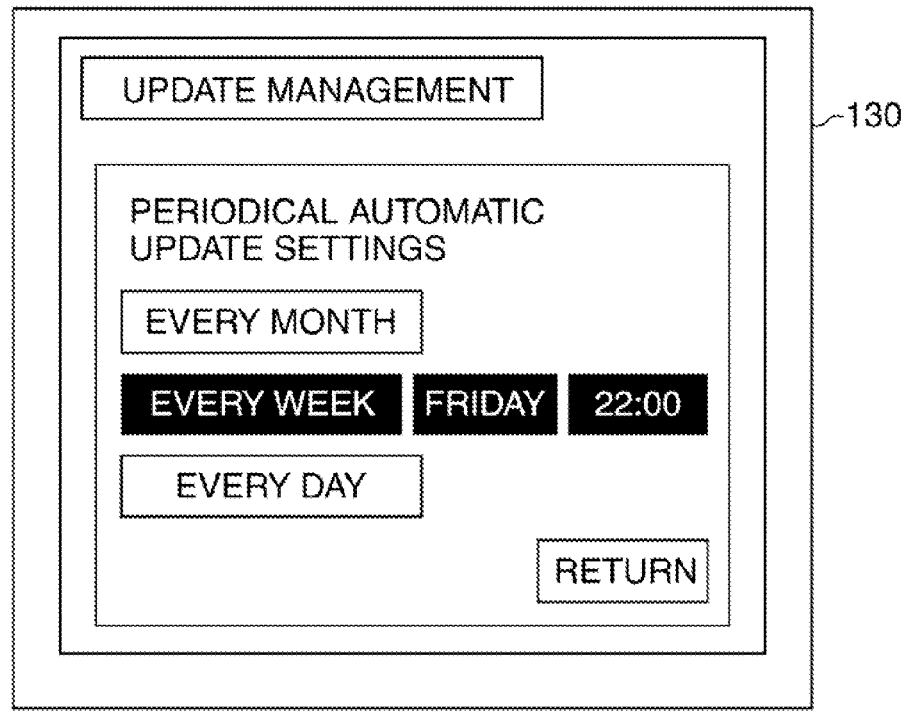
FIG. 10 is a view of a periodical automatic update-setting screen displayed when a periodical automatic update-setting button appearing in FIG. 9 is depressed.

FIG. 10 is a view of a periodical automatic update-setting screen displayed when the periodical automatic update-setting button 1130 appearing in FIG. 9 is depressed.

The periodical automatic update-setting screen shown in FIG. 10 provides setting boxes where one of every month, every week, and every day can be selectively set, and in the illustrated example, the setting boxes of "every week", "Friday", and "22:00" are selected and highlighted so as to indicate that these settings are active.

The periodical automatic update settings set as above are stored in the HDD 113. The update module 401 periodically checks the current time and the set day of the week and time, and starts update processing when it is the set time. Therefore, in the case of the settings shown in FIG. 10, the update processing is automatically started at 22:00 on Friday every week.

Figure 11A:
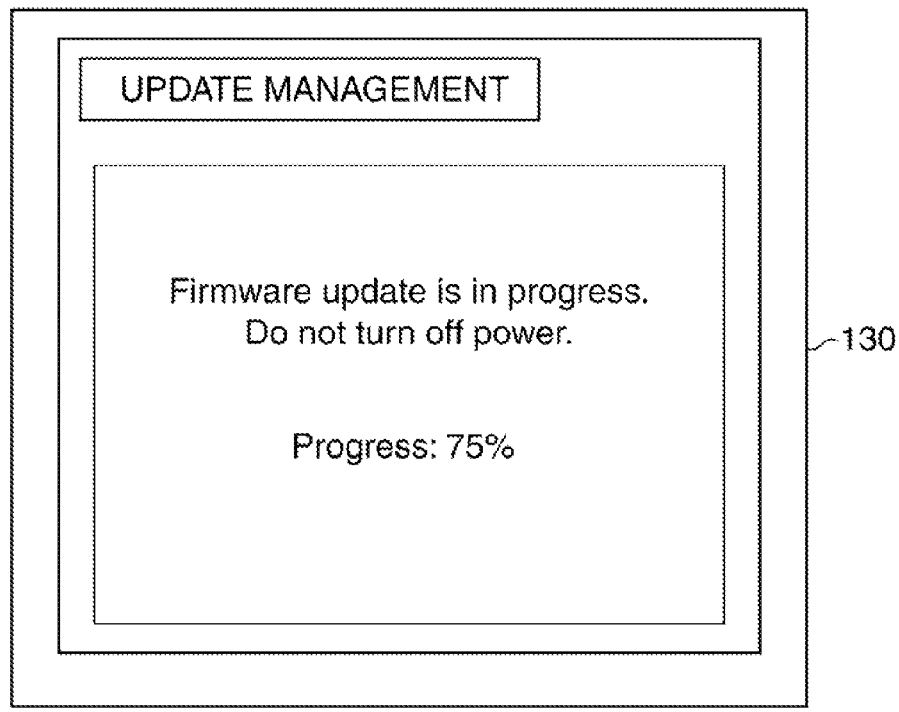
Figure 11B:
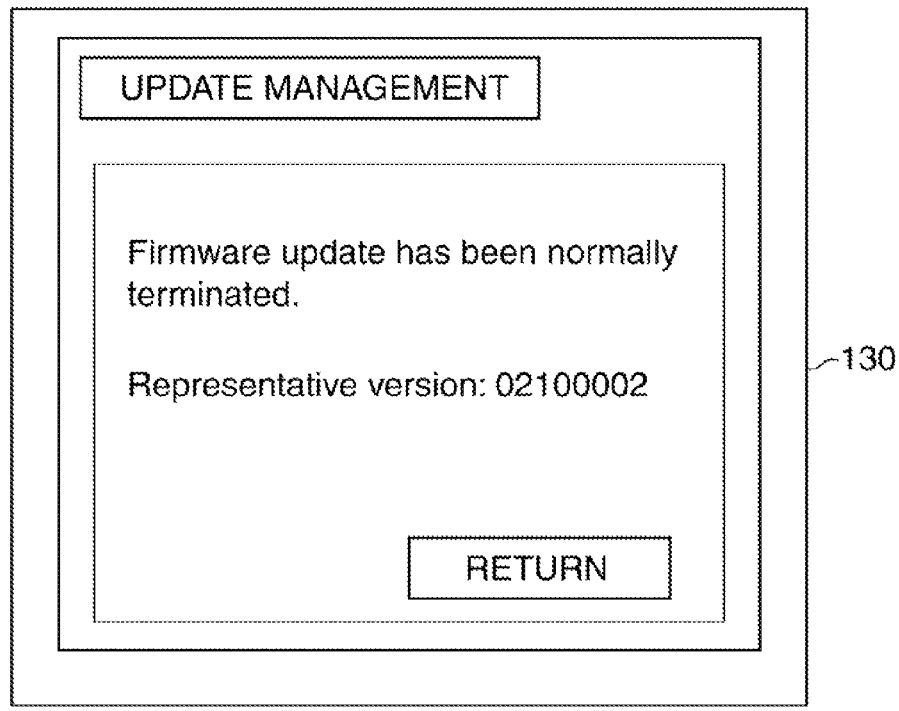

FIGS. 11A and 11B are views of screens displayed on the console section 130 in FIG. 2 when the update processing is performed, in which FIG. 11A shows a screen displayed when the update processing is being performed, and FIG. 11B shows a screen displayed when the update processing has been normally terminated.

The FIG. 11A screen displays not only the state of progress of the update processing but also a message for warning the user not to turn off the power of the image processing apparatus 10.

Further, the FIG. 11B screen displays not only a message indicative of normal termination of the update processing but also a representative version of the updated firmware.

Figure 12A:
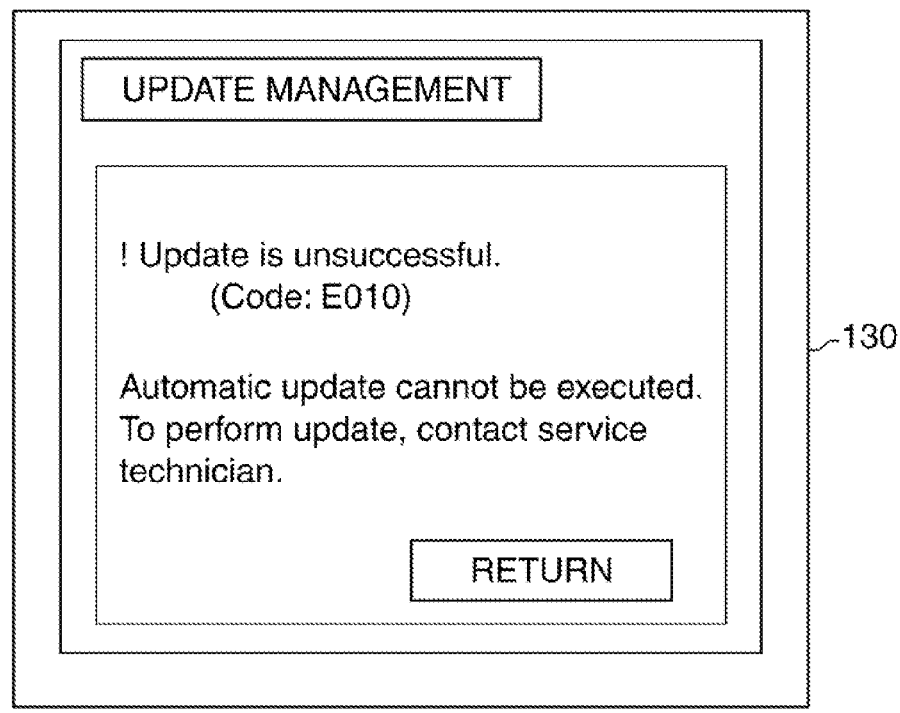
Figure 12B:
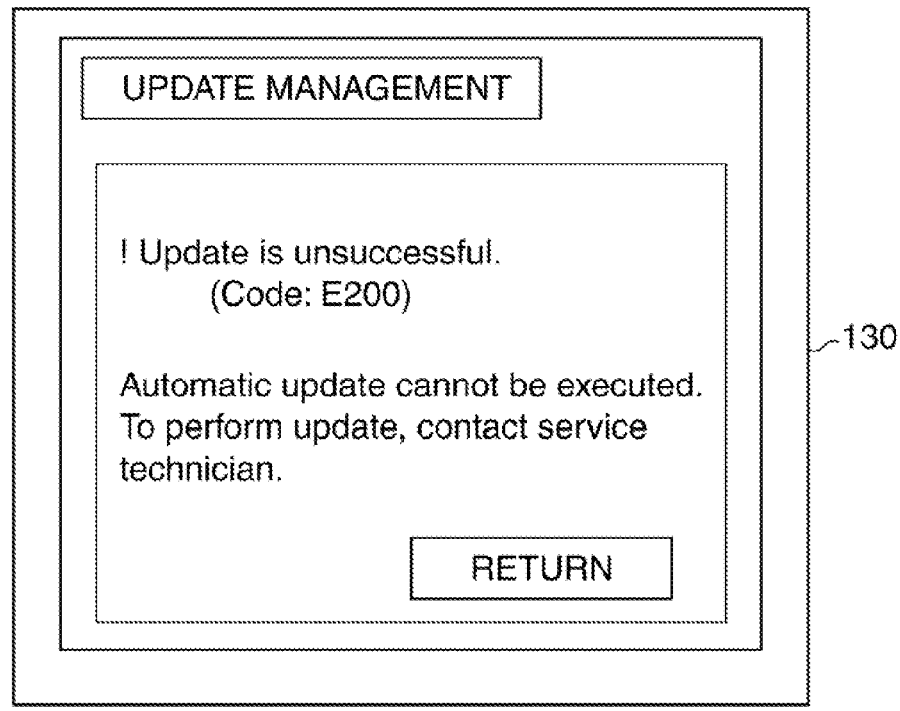

FIGS. 12A and 12B are views of screens displayed on the console section 130 in FIG. 2 when the update processing is unsuccessful, in which FIG. 12A shows a screen displayed when the update processing has failed with an error code of E010, and FIG. 12B shows a screen displayed when the update processing has failed with an error code of E200.

Both the FIGS. 12A and 12B screens each display a message indicating failure of the update processing, the error code, and a message advising the user to notify a service technician of the fact.

The error code of E010 shown in FIG. 12A indicates inhibition of automatic update since the automatic update involves the clearing of data stored in the SRAM 112. Specifically, to update firmware of the image processing apparatus 10 to new firmware, it is sometimes required to delete configuration data stored in the SRAM 112 of the image processing apparatus 10. In such a case, unless the update is performed after the service technician has backed up the data stored in the SRAM 112 onto an external storage device of the image processing apparatus 10, the data in the SRAM 112 is lost.

Further, the error code of E200 shown in FIG. 12B indicates that the combination of firmware components is not normal.

Figure 13:
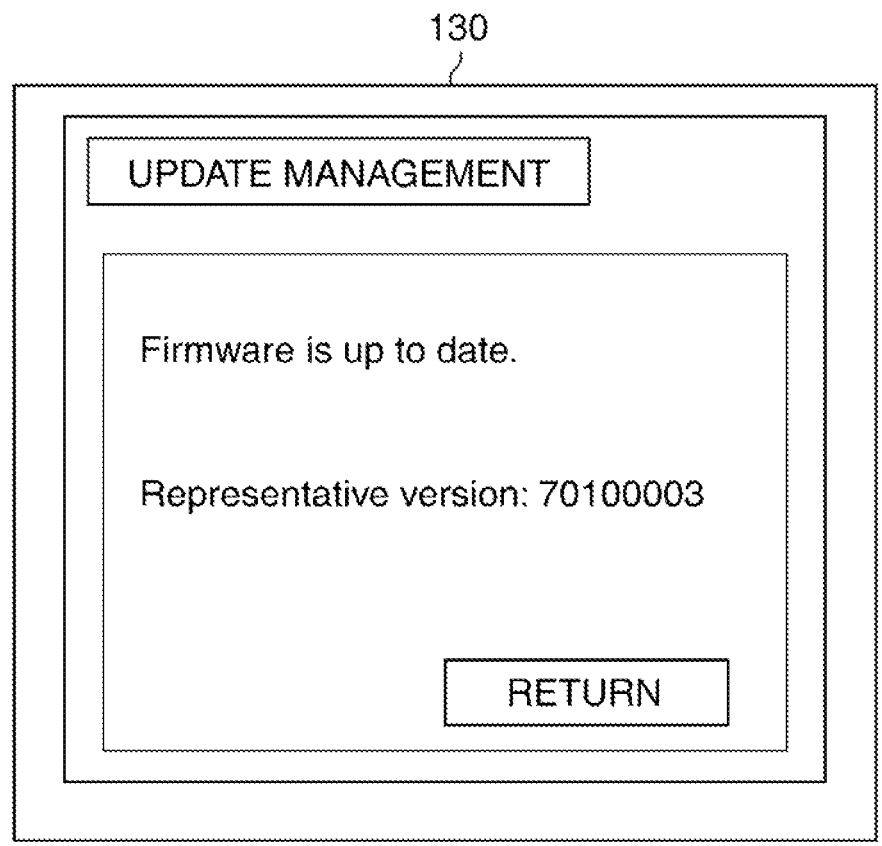
FIG. 13 is a view of a screen displayed on the console section in FIG. 2 when there is no need to execute update processing.

FIG. 13 is a view of a screen displayed on the console section 130 in FIG. 2 when there is no need to execute update processing.

The FIG. 13 screen is displayed when the firmware installed in the image processing apparatus 10 is the latest version.

Figure 14:
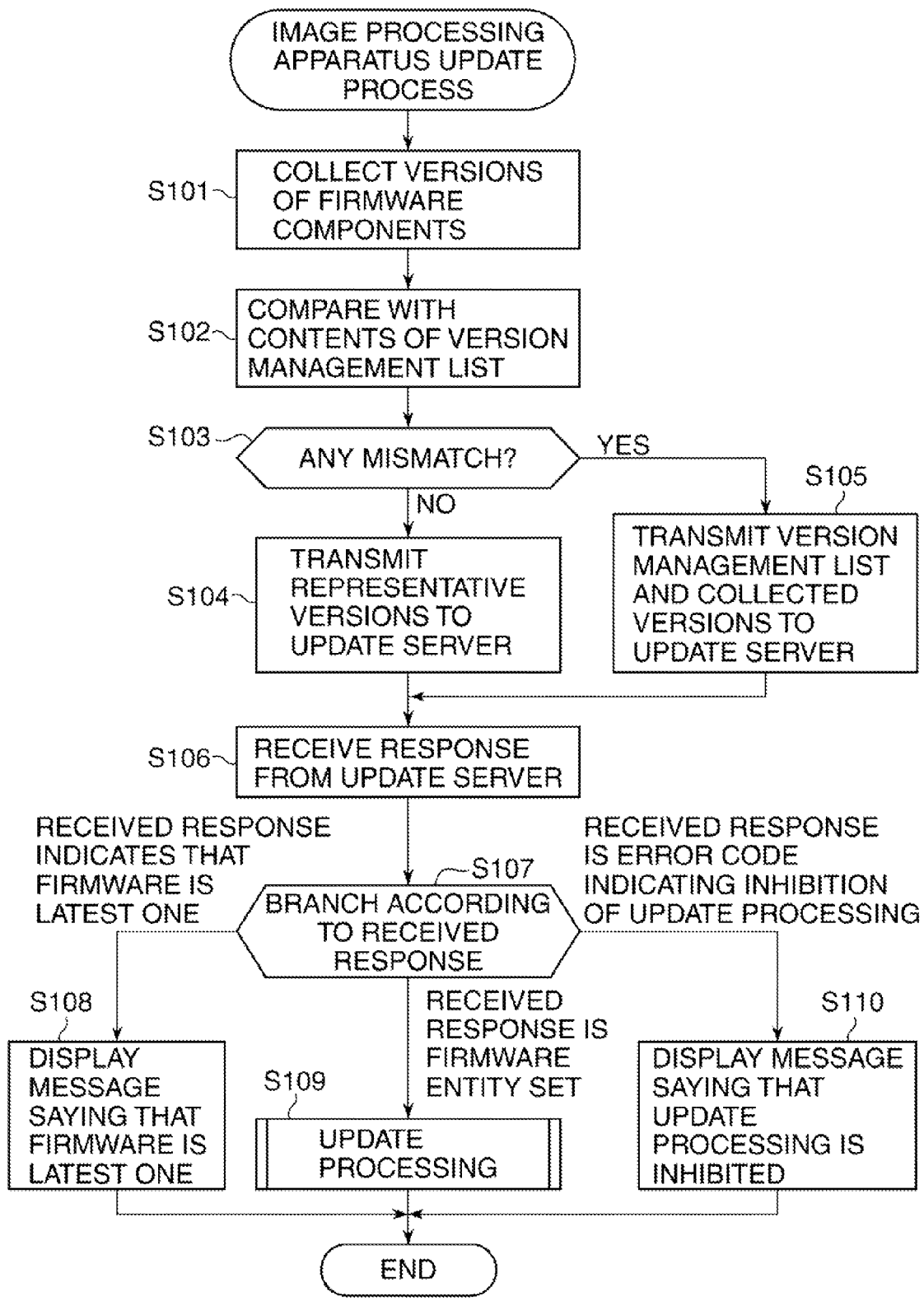
FIG. 14 is a flowchart of an image processing apparatus update process executed by a CPU appearing in FIG. 2.

FIG. 14 is a flowchart of an image processing apparatus update process executed by the CPU 110 appearing in FIG. 2.

The image processing apparatus update process shown in FIG. 14 is executed by the CPU 110 executing the update module 401 included in the controller firmware 101 loaded from the HDD 113 into the RAM 111. Further, the image processing apparatus update process is executed when the update execution button 1120 is depressed by the user on the FIG. 9 screen, or when it is time of periodical automatic update set on the FIG. 10 screen.

First, the update module 401 collects the present version of the controller firmware by accessing the controller version 460 in the HDD 113 and the present version of the printer engine firmware by communicating with the printer engine 131 via the printer control module 440 (step S101). The step S101 corresponds to a function of a collection unit configured to collect actual versions of a plurality of firmware components.

Then, the update module 401 reads the controller firmware version 602 and the printer engine firmware version 603 from the version management list 102 in the HDD 113, and compares them with the collected versions (step S102).

Next, the update module 401 determines whether or not a mismatch has occurred between the version management list 102 and the collected versions (step S103). The determination of whether or not a mismatch has occurred therebetween will be described with reference to FIGS. 15A and 15B, referred to hereinafter. The step S103 corresponds to a function of a first determination unit configured to determine whether or not the collected actual versions are different from versions of respective firmware components indicated in a first version management list. This first version management list will be described with reference to FIGS. 15A and 15B.

When it is determined in the step S103 that no mismatch has occurred between the version management list 102 and the collected versions (NO to the step S103), the update module 401 transmits the representative version 601 in the version management list 102 to the update server 20 (step S104). Thus, when it is determined that the actual versions and the versions of the firmware components indicated in the first version management list match each other, respectively, a representative version indicated in the first version management list is transmitted to the server.

On the other hand, when it is determined in the step S103 that a mismatch has occurred between the version management list 102 and the collected versions (YES to the step S103), the update module 401 transmits the version management list 102 and the collected versions to the update server 20 (step S105). Note that conventionally, when it is determined that a mismatch has occurred, the process used to jump to a step S109 to stop the update processing. The step S105 corresponds to a function of a transmission unit configured to transmit the actual versions and the representative version indicated in the first version management list to the server when it is determined that the actual versions and the versions of the respective firmware components indicated in the first version management list are different.

Subsequently, the update module 401 receives a response from the update server 20 (step S106), and the image processing apparatus update process branches according to the received response (step S107).

When it is determined in the step S107 that the received response indicates that the image processing apparatus 10 has latest firmware, the update module 401 displays a message indicating that the present firmware is latest firmware, on the console section 130, using the screen shown in FIG. 13 (step S108), followed by terminating the present process.

When it is determined in the step S107 that a firmware entity set (update firmware) has been received, the update module 401 performs update processing, described hereinafter, (step S109), followed by terminating the present process.

When it is determined in the step S107 that an error code indicating inhibition of the update processing has been received, the update module 401 displays a message notifying inhibition of the update processing, using the screen shown in FIG. 12A or 12B (step S110), followed by terminating the present process.

Figure 15A:
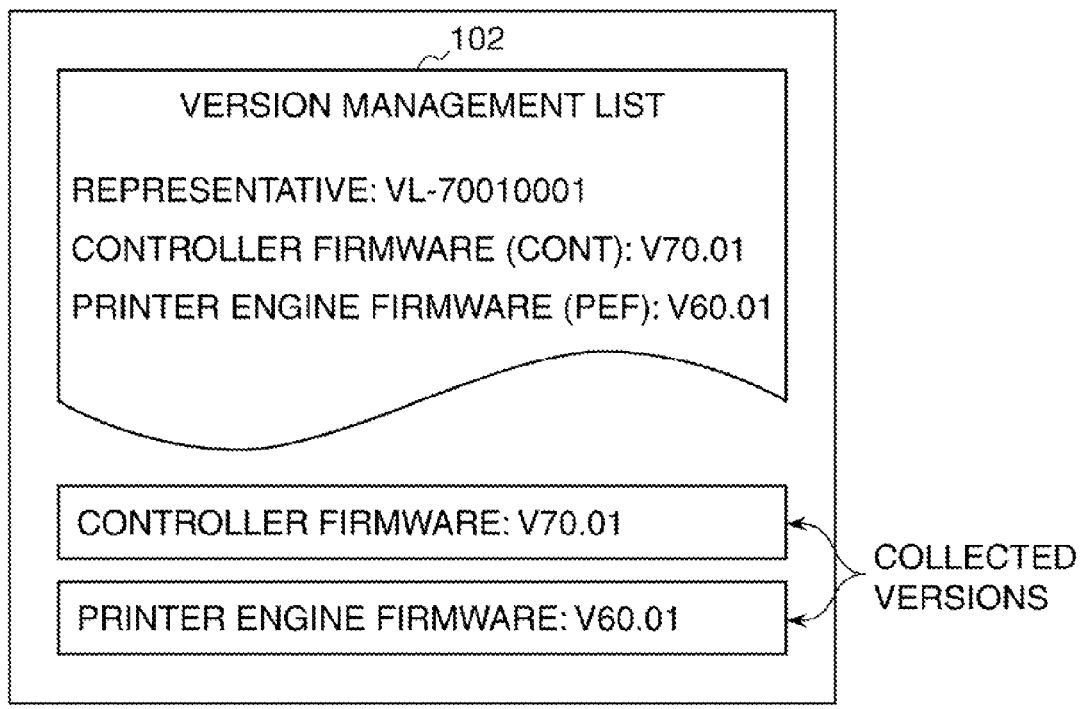
FIGS. 15A and 15B are views of version management lists and collected versions, for use in determination in a step in FIG. 14.
Figure 15B:
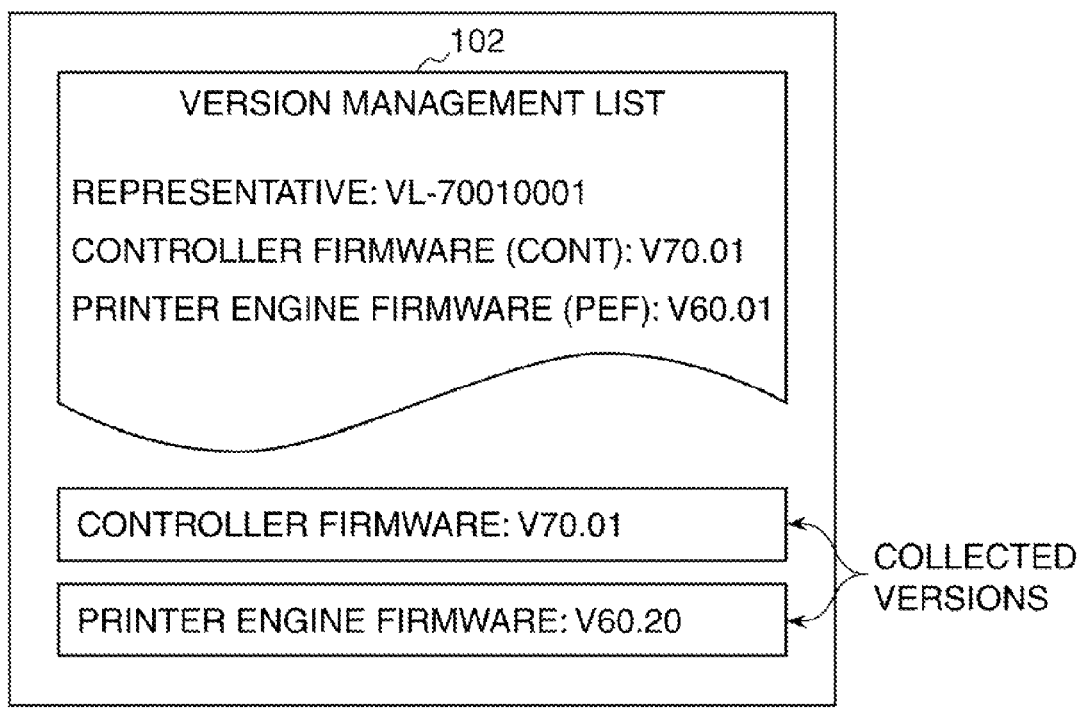

FIGS. 15A and 15B are views of the version management lists 102 and the collected versions, which are used for determination in the step S103 in FIG. 14. The version management list 102 shown in each of FIGS. 15A and 15B corresponds to the first version management list indicating versions of respective firmware components and a representative version for managing the versions of the respective firmware components, and is stored in advance in the HDD 113 (first storage unit).

FIG. 15A shows an example in which the version management list 102 and the collected versions match each other. In this case, since it is determined that no mismatch has occurred, a representative version 700010001 is transmitted to the update server 20 in the step S104.

On the other hand, FIG. 15B shows an example in which the version management list 102 and the collected versions do not match each other. Specifically, the versions of the printer engine firmware are different from each other. In a case where from the state of no mismatch between the version management list 102 and the collected versions, a hardware component is replaced with a new hardware component due to hardware-related failure of the printer engine 131, the above difference or mismatch can occur when the new hardware component includes a printer engine firmware 132 of a different version as well.

In this case, it is determined that a mismatch has occurred, and hence in the step S105, the version management list 102 and the collected versions are transmitted to the update server 20.

Figure 16:
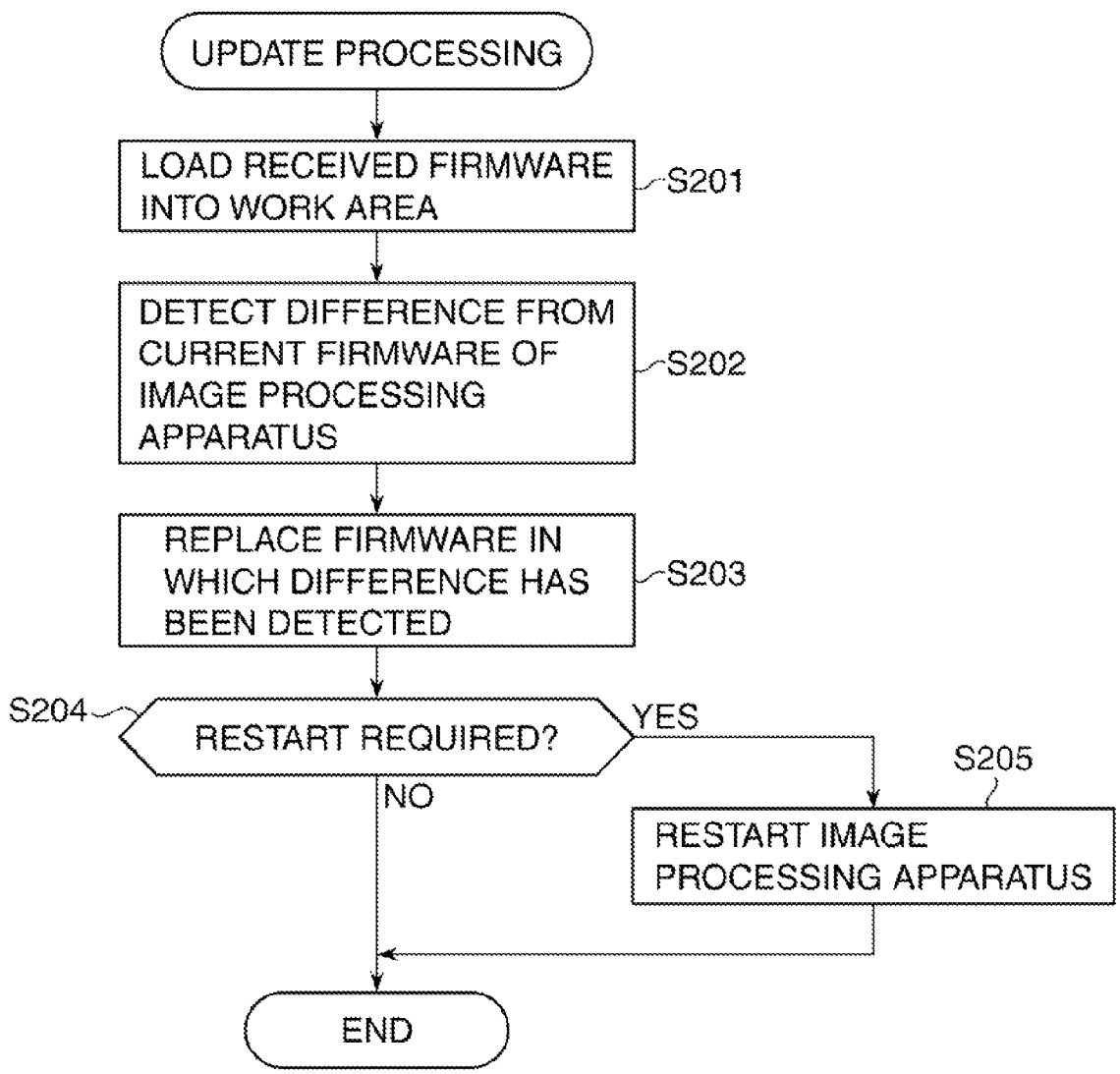
FIG. 16 is a flowchart of update processing executed in a step in FIG. 14.

FIG. 16 is a flowchart of the update processing executed in the step S109 in FIG. 14.

Referring to FIG. 16, the update module 401 loads the firmware entity set received from the update server 20 into a work area of the HDD 113 (step S201). Note that at this time, out of the version branch management information 510, a version management list indicating a representative version, a controller firmware version, and a printer engine firmware version, corresponding to the firmware entity set, is also received from the update server 20.

Then, the update module 401 detects any difference between the contents of the version management list and the current firmware versions of the image processing apparatus 10 (step S202).

Next, the update module 401 replaces firmware on which any difference has been detected (step S203). Specifically, the update processing is executed by replacing the firmware on which any difference has been detected by new firmware. At this time, the screen shown in FIG. 11A is displayed. Further, when the update processing is normally terminated, the screen shown in FIG. 11B is displayed. The above-described step S203 corresponds to a function of an update unit configured to update firmware installed in the image processing apparatus 10, using update firmware provided from the server.

For example, when the firmware to be replaced is controller firmware, the update module 401 updates the controller firmware 101 stored in the HDD 113, whereas when the firmware to be replaced is printer engine firmware, the update module 401 updates the printer engine firmware 132 via the printer control module 440.

Next, the update module 401 determines whether or not the restart of the image processing apparatus 10 is required after execution of the update processing (step S204). When it is determined in the step S204 that the restart of the image processing apparatus 10 is required (YES to the step S204), the update module 401 restarts the image processing apparatus 10 (step S205), followed by terminating the present process.

On the other hand, when it is determined in the step S204 that the restart of the image processing apparatus 10 is not required (NO to the step S204), the update module 401 immediately terminates the present process. This places the image processing apparatus 10 in a normal operating state with the new firmware.

Figure 17:
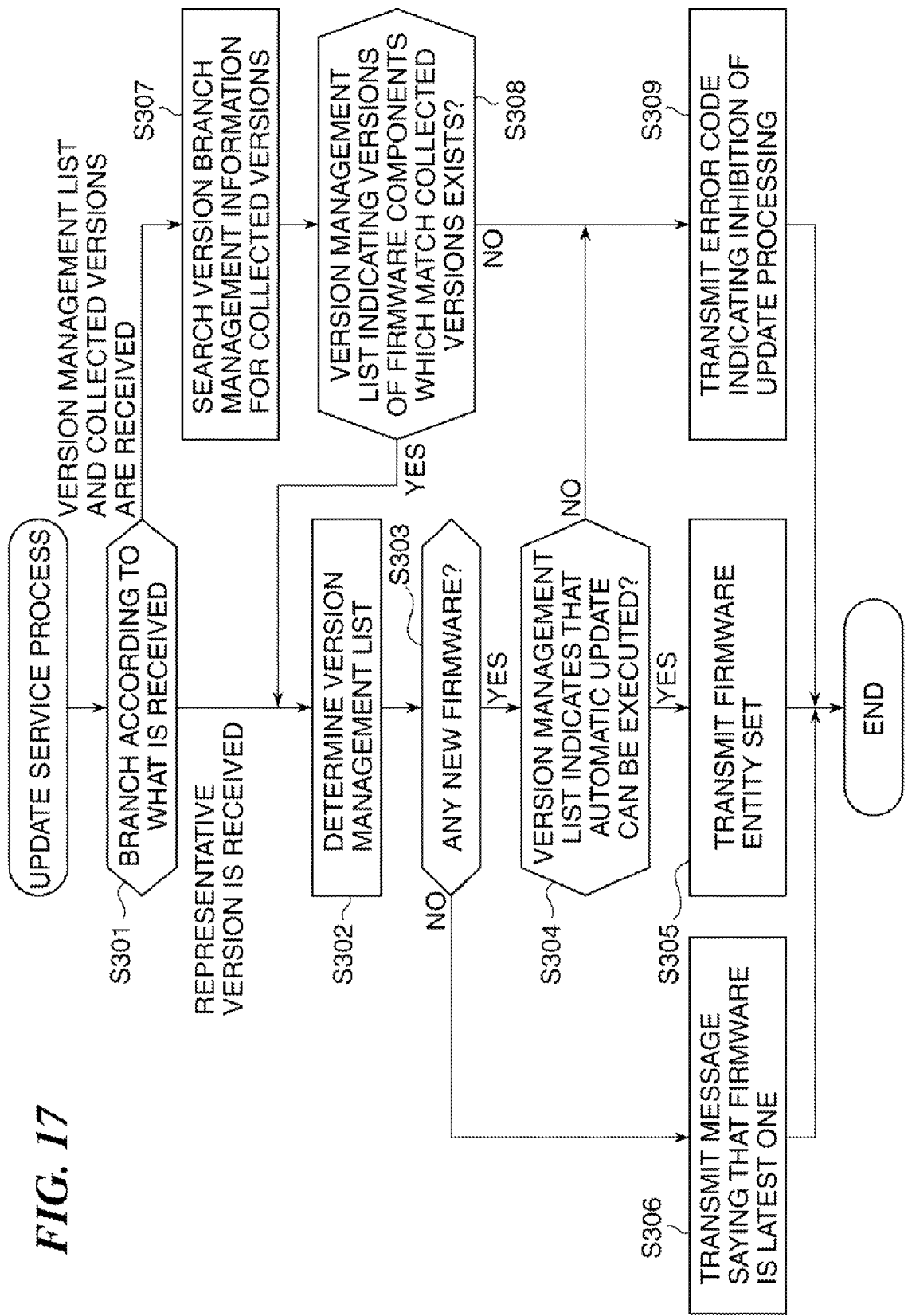
FIG. 17 is a flowchart of an update service process executed by a CPU of the update server appearing in FIG. 4.

FIG. 17 is a flowchart of an update service process executed by the CPU 210 of the update server 20 appearing in FIG. 4.

Referring to FIG. 17, the update service process branches according to what is received from the image processing apparatus 10 (step S301). When it is determined in the step S301 that a representative version has been received, the update application 201 determines the model of the image processing apparatus 10 based on the received representative version. Further, the update application 201 determines a version management list corresponding to the received representative version from the version branch management information 510 (step S302).

For example, in a case where the received representative version is 700010001, it is determined from the version branch management information 510 shown in FIG. 6 that a firmware version associated with the image processing apparatus 10 is A.

Then, the update application 201 determines based on the version branch management information 510 whether or not there is any new firmware component (step S303). In the case of the firmware version is A in FIG. 6, the update application 201 determines that the new firmware corresponds to firmware version C in the version branch management information 510.

When it is determined in the step S303 that there is no new firmware (NO to the step S303), the update application 201 transmits a message indicating that the version of the firmware of the image processing apparatus 10 is latest (step S306), followed by terminating the present process.

On the other hand, when it is determined in the step S303 that there is new firmware (YES to the step S303), the update application 201 determines whether or not the permission/inhibition information in a version management list corresponding to the new firmware indicates that automatic firmware update can be executed (step S304).

When it is determined in the step S304 that the permission/inhibition information in a version management list corresponding to the new firmware indicates that automatic firmware update can be executed (YES to the step S304), the update application 201 transmits the firmware entity set and the version management list (step S305), followed by terminating the present process. At this time, the firmware entity set and the version management list may be transmitted as one data item obtained by compressing them.

The step S305 corresponds to a function of a provision unit configured to provide new firmware indicated in a second version management list including the new firmware to the image processing apparatus 10 as update firmware.

Specifically, in a case where the step S305 is reached via a step S308, referred to hereinafter, it implies that it is determined in the step S308 that there is a second version management list indicating the versions of firmware components which match the actual versions of the firmware components installed in the image processing apparatus 10. Further, the affirmative answer to the question of the step S303 indicates that there is a second version management list which includes any firmware component newer than the corresponding firmware component indicated in the second version management list indicating the versions of firmware components which match the actual versions of the firmware components installed in the image processing apparatus 10. Further, the affirmative answer to the step S304 means that the permission/inhibition information in the version management list indicates that the firmware installed in the image processing apparatus 10 can be updated using update firmware.

If a version management list and collected versions are received in the step S301, the version branch management information 510 is searched for the collected versions which are actual (step S307).

Then, it is determined whether or not, the version branch management information 510 contains a firmware version (represented by the representative version) indicating versions of firmware components that match the collected versions (step S308). The step S308 corresponds to a function of a second determination unit configured to determine whether or not there is a second version management list indicating the versions of firmware components which match the actual versions of the firmware components installed in the image processing apparatus 10.

If it is determined in the step S308 that the version branch management information 510 contains a firmware version indicating versions of firmware components that match the collected versions (YES to the step S308), the CPU 210 proceeds to the step S302. For example, in the case of FIG. 15B, the firmware version management list corresponds to the firmware version A of the version branch management information 510, whereas the collected versions correspond to the firmware version B of the version branch management information 510. In this case, normal update processing can be performed from the step S302.

On the other hand, if it is determined in the step S308 that the version branch management information 510 contains no firmware indicating versions of firmware components that match the collected versions (NO to the step S308), an error code indicating inhibition of the update processing is transmitted (step S309), followed by terminating the present process. Here, in the case where the step S309 is reached via the step S308, the transmitted error code is the error code of E200, whereas in the case where the step S309 is reached via the step S304, the transmitted error code is the error code of E010. As described above, when it is determined that there is no second version management list indicating versions of firmware components that match the transmitted actual versions of the firmware components installed in the image processing apparatus 10 (NO to the step S308), no update firmware is provided, but an error code (error code of E200) indicating that firmware update cannot be performed is transmitted to the image processing apparatus 10.

According to FIGS. 14, 15, 17, it is possible to provide a firmware update system capable of executing update processing which could not be executed despite the fact that the combination of versions of firmware components installed in the image processing apparatus is normal. Specifically, first, when it is determined that the actual versions and versions of respective firmware components indicated in a first version management list are different (YES to the step S103), the actual versions and a representative version indicated in the first version management list are transmitted to the server (step S150).

Then, when it is determined that there is a second version management list indicating versions of the firmware components which match the actual versions of the firmware components installed in the image processing apparatus 10 (YES to the step S308), and when it is determined that there is a second version management list which includes any firmware component newer than the corresponding firmware component(s) indicated in the second version management list indicating the versions of the firmware components which match the actual versions of the firmware components installed in the image processing apparatus 10 (YES to the step S303), the following processing is performed: New firmware indicated in the second version management list including the new firmware component(s) is provided to the image processing apparatus as update firmware (step S305). This makes it possible to update the firmware installed in the image processing apparatus 10, using the update firmware provided from the server (step S203).

In the conventional technique, when the answer to the question of the step S103 is affirmative, update processing cannot be executed despite the fact that the combination of versions of the firmware components installed in the image processing apparatus is normal. However, the present embodiment makes it possible to execute the update processing.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2012-127008 filed Jun. 4, 2012, which is hereby incorporated by reference herein in its entirety.

What is claimed is:

1. A firmware update system having a processor including an image processing apparatus in which a plurality of firmware components are installed and which operates according to the plurality of firmware components, and a server which provides update firmware for updating the plurality of firmware components, to the image processing apparatus, wherein the image processing apparatus comprises:

a first storage unit configured to store in advance a first version management list indicating versions of the respective firmware components and a representative version for managing the versions of the respective firmware components;

a collection unit configured to collect actual versions of the plurality of firmware components; a first determination unit configured to determine whether or not there is a difference between the actual versions collected by said collection unit and the versions of the respective firmware components indicated in the first version management list;

a transmission unit configured to, when it is determined by said first determination unit that there is a difference between the actual versions and the versions of the respective firmware components indicated in the first version management list, transmit the actual versions and the representative version indicated in the first version management list, to the server; and an update unit configured to update the firmware components installed in the image processing apparatus using the update firmware provided by the server, and wherein the server comprises:

a second storage unit configured to store in advance a plurality of second version management lists each indicating a normal combination of versions of the firmware components of the image processing apparatus and a representative version;

a second determination unit configured to determine whether or not the plurality of second version management lists include a second version management list indicating versions of the firmware components which match the actual versions transmitted from said transmission unit; and a provision unit configured to provide, when said second determination unit determines that the plurality of second version management lists include a second version management list indicating versions of the firmware components which match the actual versions, and when the plurality of second version management lists include a second version management list that includes any firmware component newer than a corresponding firmware component indicated in the second version management list indicating the versions of the firmware components which match the actual versions, firmware indicated in the second version management list including the newer firmware component, to the image processing apparatus, as update firmware.

2. The firmware update system according to claim 1, wherein when said first determination unit determines that the actual versions and the versions of the respective firmware components indicated in the first version management list match each other, said transmission unit transmits the representative version indicated in the first version management list to the server, and wherein when the plurality of second version management lists include a second version management list including any firmware component newer than a corresponding firmware component indicated in the second version management list indicating a representative version which matches the representative version transmitted from said transmission unit, said provision unit provides the firmware indicated in the second version management list including the newer firmware component, to the image processing apparatus, as the update firmware.

3. The firmware update system according to claim 1, wherein when said second determination unit determines that the plurality of second version management lists include no second version management list indicating versions of the firmware components which match the actual versions transmitted from said transmission unit, said provision unit transmits an error code indicating that update of the firmware cannot be performed, to the image processing apparatus.

4. The firmware update system according to claim 1, wherein the second version management list includes permission/inhibition information indicative of whether or not the firmware components installed in the image processing apparatus can be updated using the update firmware when the firmware indicated in the second version management list is provided to the image processing apparatus as the update firmware, and wherein when said second determination unit determines that the plurality of second version management lists include a second version management list indicating versions of the firmware components which match the actual versions, and when the plurality of second version management lists include a second version management list that includes any firmware component newer than a corresponding firmware component indicated in the second version management list indicating the versions of the firmware components which match the actual versions, and further, when the permission/inhibition information included in the second version management list including the newer firmware component indicates that said update unit can update the firmware components installed in the image processing apparatus using the update firmware, said provision unit provides firmware indicated in the second version management list including the newer firmware component to the image processing apparatus as the update firmware.

* * * * *